US011623267B2

(12) United States Patent
Matsuura (10) Patent No.: US 11,623,267 B2
(45) Date of Patent: Apr. 11, 2023

(54) OPTICAL SAFETY DEVICE FOR PRESS BRAKE, PRESS BRAKE, AND OPTICAL MONITORING METHOD

(71) Applicant: Amada Co., Ltd., Kanagawa (JP)

(72) Inventor: Kento Matsuura, Kanagawa (JP)

(73) Assignee: AMADA CO., LTD., Kanagawa (JP)

( * ) Notice: Subject to any disclaimer, the term of this patent is extended or adjusted under 35 U.S.C. 154(b) by 0 days.

(21) Appl. No.: 16/979,599

(22) PCT Filed: Mar. 12, 2019

(86) PCT No.: PCT/JP2019/009951
§ 371 (c)(1),
(2) Date: Sep. 10, 2020

(87) PCT Pub. No.: WO2019/176924
PCT Pub. Date: Sep. 19, 2019

(65) Prior Publication Data
US 2021/0039156 A1 Feb. 11, 2021

(30) Foreign Application Priority Data
Mar. 14, 2018 (JP) .............................. JP2018-046297

(51) Int. Cl.
*B21D 55/00* (2006.01)
*B21D 5/02* (2006.01)
(52) U.S. Cl.
CPC ........... *B21D 55/00* (2013.01); *B21D 5/0209* (2013.01)
(58) Field of Classification Search
CPC ........ B21D 55/00; B21D 5/0209; B21D 5/02; B21D 5/002; B21D 5/006; B21D 5/008;
(Continued)

(56) References Cited

U.S. PATENT DOCUMENTS 5,015,840 A * 5/1991 Blau ..................... G01V 8/20
250/208.3
7,034,929 B2 * 4/2006 Bergbach ............... F16P 3/144
356/141.3
(Continued)

FOREIGN PATENT DOCUMENTS

CN 1434239 A 8/2003
DE 102016100445 A1 7/2017
(Continued)

OTHER PUBLICATIONS

International Search Report for corresponding Application No. PCT/JP2019/009951, dated May 7, 2019.
(Continued)

*Primary Examiner* — Shelley M Self
*Assistant Examiner* — P Derek Pressley
(74) *Attorney, Agent, or Firm* — Renner, Otto, Boisselle & Sklar, LLP (57) ABSTRACT

A determination part determines whether or not a shadow of an upper mold is expanded to a photodiode by laser beam projected to a light receiver side based on a light receiving state of a photodiode positioned in a vicinity of the upper mold. When it is determined that the shadow of the upper mold is expanded to the photodiode positioned in the nearest vicinity of the upper mold, the invalidation unit invalidates the photodiode. A detection unit detects a presence or absence of a foreign body between the upper mold and a lower mold based on light receiving states of the effective plurality of photodiodes during a lowering operation of an upper table.

5 Claims, 7 Drawing Sheets (58) Field of Classification Search
CPC ........ B30B 15/26; B30B 15/285; F16P 3/144; F16P 3/14; G05B 2219/45143
See application file for complete search history.

(56) References Cited

U.S. PATENT DOCUMENTS

| | | | |
|---|---|---|---|
| 7,671,322 B2* | 3/2010 | Schmitz | F16P 3/144 250/221 |
| 2003/0146373 A1 | 8/2003 | Kudo | |
| 2004/0070751 A1 | 4/2004 | Bergbach | |
| 2005/0247102 A1 | 11/2005 | Schneiderheinze | |
| 2008/0285842 A1* | 11/2008 | Plasberg | G01S 17/48 382/154 |
| 2010/0220184 A1* | 9/2010 | Appleyard | F16P 3/142 250/221 |
| 2013/0201480 A1* | 8/2013 | Meinherz | G02B 27/106 356/399 |
| 2015/0314364 A1 | 11/2015 | Fiessler | |
| 2016/0298809 A1* | 10/2016 | Lutz | G01S 17/08 |

FOREIGN PATENT DOCUMENTS

| | | | |
|---|---|---|---|
| EP | 0789182 A1 | 8/1997 | |
| EP | 1387121 A2 | 2/2004 | |
| JP | 10-156595 A | 6/1998 | |
| JP | 10156595 A * | 6/1998 | ........... B30B 15/285 |
| JP | 2003-218679 A | 7/2003 | |
| JP | 2005-296966 A | 10/2005 | |
| JP | 2006-504914 A | 2/2006 | |
| JP | 2007-203310 A | 8/2007 | |
| JP | 2015-211984 A | 11/2015 | |
| JP | 2016-128180 A | 7/2016 | |
| WO | 2005/056207 A1 | 6/2005 | |
| WO | 2017/179355 A1 | 10/2017 | |

OTHER PUBLICATIONS

Written Opinion for corresponding Application No. PCT/JP2019/009951, dated May 7, 2019.
Chinese Office Action for corresponding Application No. 2019800189279 dated Sep. 30, 2021.
Extended European Search Report for corresponding EP Application No. 19766505.2 dated Nov. 11, 2021.

* cited by examiner

OPTICAL SAFETY DEVICE FOR PRESS BRAKE, PRESS BRAKE, AND OPTICAL MONITORING METHOD

TECHNICAL FIELD

The present invention relates to an optical safety device for a press brake that monitors an entry of foreign body between an upper die and a lower die of the press brake.

BACKGROUND ART

In general, a press brake includes a lower table for holding a lower die on an upper side of the lower table, an upper table for holding an upper die on a lower side of the upper table, and an elevating actuator for lifting and lowering the upper table relative to the lower table. In the press brake, in order to bend a workpiece, the upper die and the lower die cooperate by a lowering operation of the upper table with driving of the elevating actuator.

In recent years, it has become common to equip the press brake with an optical safety device to sufficiently secure the safety of the bending work (referring Patent Literature 1 and Patent Literature 2). The optical safety device is provided with a projector being provided on one side in a length direction of the upper table for projecting a monitoring light directly under the upper die toward the other side in the length direction of the upper table, and a light receiver being provided on the other side in the length direction of the upper table for receiving the monitoring light. The light receiver has a light receiving element that outputs an electric signal (voltage signal) corresponding to the amount of light received as the monitoring light. A control device provided in the press brake detects (and monitor) the presence or absence of foreign body between the upper die and the lower die based on the light receiving state (result of light reception) of the light receiving element of the light receiver during the lowering operation of the upper table. When a presence of foreign body between the upper die and the lower die is detected, the control device of the press brake controls the elevating actuator so as to stop the lowering operation of the upper table.

PRIOR ART DOCUMENT

Patent Literature

Patent Literature 1: Japanese Patent Application Publication No. 2007-203310

Patent Literature 2: Japanese Patent Application Publication No. 2016-128180

SUMMARY OF THE INVENTION

Figure 1:
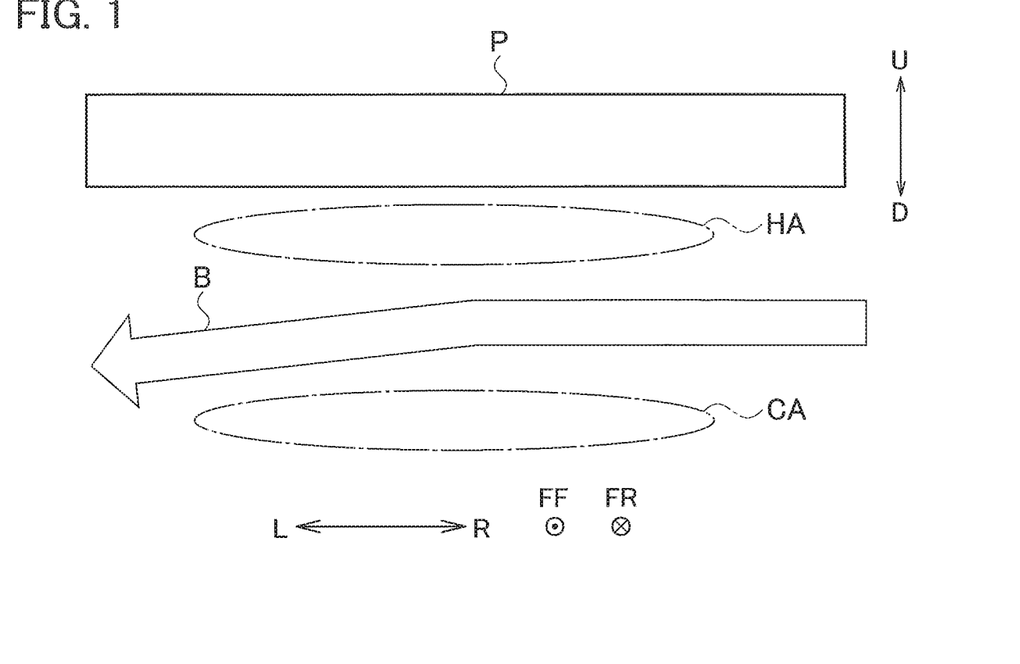
FIG. 1 is a schematic diagram illustrating how the monitoring light is bent toward the region of cold air.
Figure 2:
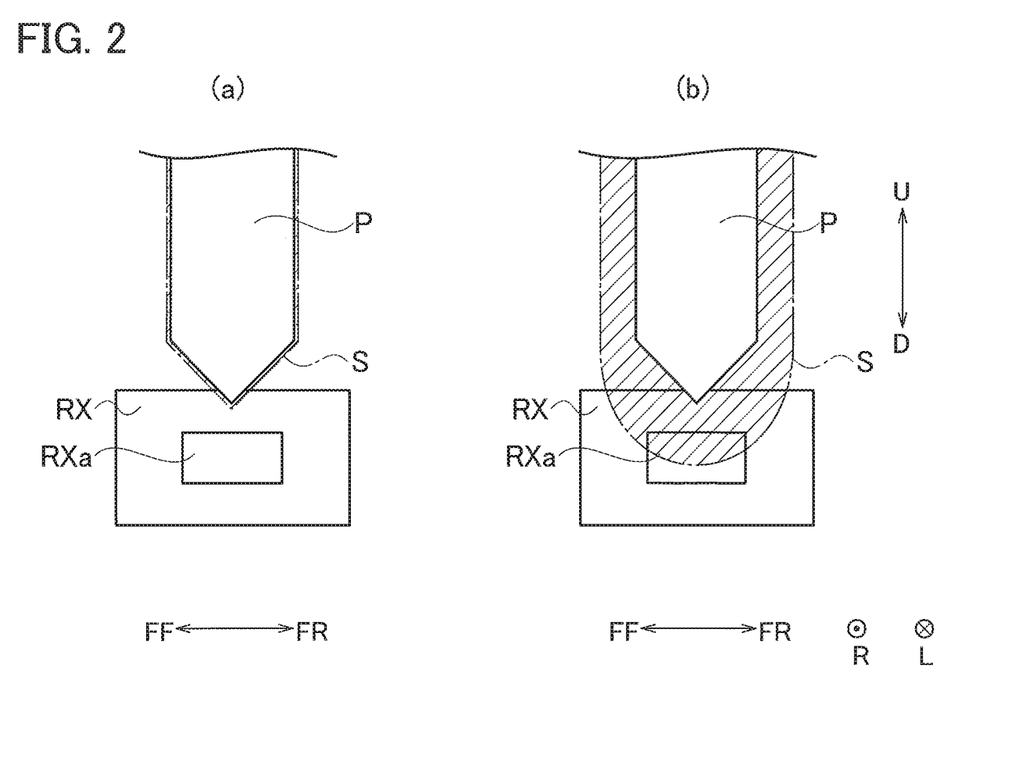

When an environmental temperature in a factory drops in an evening or winter and a temperature difference occurs between the environmental temperature in the factory and a member temperature of an upper mold, air on a side far from the upper mold is cold, but air on a side close to the upper mold is heated by the upper mold. Therefore, as shown in FIG. 1, a region HA of warm air and a region CA of cold air are formed around the upper mold P, and a layer of air with a temperature gradient is generated. Then, when a monitoring light B passes through the air layer having a temperature gradient, the monitoring light B is bent toward the cold air region CA due to the difference in a refractive index of the air. As a result, as shown in FIGS. 2 (a) and 2 (b), a shadow S of the upper mold P is enlarged by the monitoring light B projected on a side of a light receiver RX.

FIG. 1 is a schematic view showing how the monitoring light B is bent toward the cold air region CA. FIG. 2(a) is a schematic view showing that the shadow S of the upper mold P has the same size as the outline of the upper mold P before the monitoring light B is bent. FIG. 2(b) is a schematic view showing a state in which the shadow S of the upper mold P is enlarged after the monitoring light B is bent. In the drawing, "FF" indicates a forward direction, "FR" indicates a backward direction, "L" indicates a left direction, "R" indicates a right direction, "U" indicates an upward direction, and "D" indicates a downward direction.

The amount of expansion of the shadow S of the upper mold P due to the bending of the monitor light B is small when the optical path length of the monitor light B or a length of the upper mold P is short, but increases when the optical path length of the monitor light B and the length of the upper mold P are long. Therefore, when bending is performed in a state that a long upper die P is attached to a press brake having a long optical path length of the monitoring light B or a long overall length, if a layer of air having a temperature gradient is generated around the upper die P, the shadow S of the upper die P sometimes expands to a light receiving element RXa. In such a case, although there is no foreign body between the upper mold P and the lower mold, the control device of the press brake erroneously detects a presence of foreign body between the upper mold P and the lower mold by the shadow S of the upper mold P. As a result, the lowering operation of the upper table is stopped. That is, when the press brake is equipped with such optical safety device, there is a problem that the working efficiency (productivity) of the press brake is lowered.

Accordingly, it is an object of the present invention to provide an optical safety device for a press brake having a novel structure which can solve the problem of the aforementioned working efficiency (productivity) reduction.

A feature of the present invention is an optical safety device for a press brake comprising: a projector provided on one side in a length direction of an upper table in the press brake for projecting a monitoring light directly under an upper die and toward the other side in the length direction of the upper table; a photodetector provided on the other side in the length direction of the upper table and having a plurality of light receiving element for outputting electric signals (voltage signal) corresponding to the amount of the monitoring light and receiving the monitoring light; and an invalidation unit which invalidates the photodetectors when a shadow of the upper die projected on the photodetector by the monitoring light extends to the photodetectors positioned in a vicinity of the upper die.

Another feature of the present invention is the optical safety device, further comprising a determination unit for determining whether the shadow of the upper mold extends to the light receiving element located in the vicinity of the upper mold, and the invalidation unit invalidates the light receiving element when it is determined that the shadow of the upper mold extends to the light receiving element located in the vicinity of the upper mold.

Another feature of the present invention is the optical safety device, wherein the determination unit determines, based on a light receiving state (result of light reception) of the light receiving element located in the vicinity of the upper mold, whether or not the shadow of the upper mold extends to the light receiving element located in the vicinity of the upper mold.

Another feature of the present invention is the optical safety device, wherein the optical safety device for press brake is provided with a calculation unit for calculating an amount of enlargement of the shadow of the upper mold, and the determination unit determines whether or not the shadow of the upper mold is enlarged to the light receiving element located in the vicinity of the upper mold based on the calculated amount of enlargement of the shadow of the upper mold.

Another feature of the present invention is the optical safety device, wherein the optical safety device for press brake is provided with a changeover switch for switching the light receiving element positioned in the vicinity of the upper die to an invalidated state, and the invalidating unit invalidates the light receiving element positioned in the vicinity of the upper die when the changeover switch is operated.

Another feature of the present invention is a press brake provided with one of the above mentioned optical safety device for the press brake.

A feature of the present invention is an optical monitoring method, by using a light projector provided on one side in a length direction of an upper table in a press brake for projecting monitoring light directly under an upper die toward other side in the length direction of the upper table and a light receiving element provided on the other side in the length direction of the upper table and receiving the monitoring light, for monitoring a presence or an absence of a foreign substance between the upper die and a lower die based on a light receiving states (result of light reception) of the plurality of light receiving elements in a photodetector, comprising; a step of determining whether or not a shadow of the upper die due to the monitoring light projected on the light receiving element side is expanded to the light receiving element located in the nearest vicinity of the upper die, before the press brake starts a lowering operation of the upper table relative to the lower table in the press brake, and a step of invalidating the light receiving element when it is determined that the shadow of the upper mold extends to the light receiving element positioned nearest to the upper mold.

BRIEF DESCRIPTION OF DRAWINGS

FIG. 2 (a) is a schematic view showing a state in which the shadow of the upper mold due to the monitoring light projected on the light receiver side has the same size as the outline of the upper mold and FIG. 2(b) is a schematic view showing an enlarged shadow of the upper mold.

FIG. 5 (a) is a schematic view showing a state where the shadow of the upper mold due to the laser beam projected on the light receiver side has the same size as the outline of the upper mold, FIG. 5(b) is a schematic view showing a state in which the shadow of the upper mold extends to the photodiode in the vicinity of the upper mold, and FIG. 5C is a schematic view showing a state in which the shadow of the upper mold is enlarged to the photodiode closest to the upper mold and the photodiode is invalidated.

DESCRIPTION OF EMBODIMENTS

Hereunder, embodiments and modification according to the present invention will be explained with reference to the drawings.

Embodiments and modifications of the present invention will be described sequentially with reference to FIGS. 3 to 8.

In the description and claims of the present application, the term "be provided with" means to include indirect provision via a separate member in addition to direct provision. The term "foreign body" refers to an object other than a work, such as a worker's finger and a tool. The term "Length direction" refers to the longitudinal direction of the press brake, and in the embodiment of the present invention, refers to the lateral direction. The term "one side along the length" refers to one side in a longitudinal direction of the press brake, and in the embodiment of the present invention, refers to a right side. The term "other side in the length direction" refers to the other side in the longitudinal direction of the press brake, and in the embodiment of the present invention, refers to the left side. The term "depth direction" refers to a depth direction of the press brake, and in the embodiment of the present invention, refers to the front-rear direction. In the drawings, "FF" indicates a forward direction, "FR" indicates a backward direction, "L" indicates a left direction, "R" indicates a right direction, "U" indicates an upward direction, and "D" indicates a downward direction.

Embodiments of the Present Invention

Figure 3:
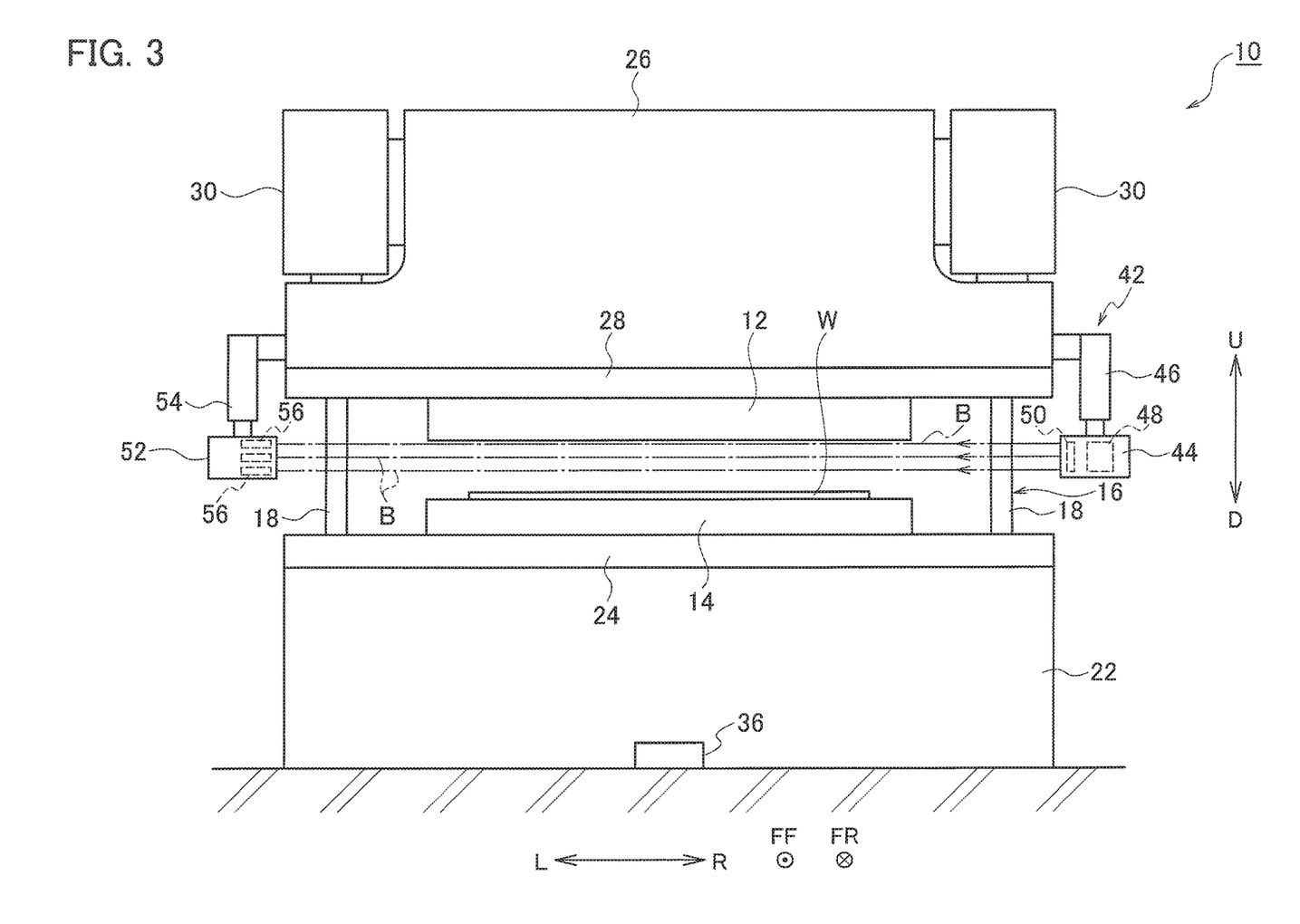
FIG. 3 is a schematic front view of a press brake according to an embodiment of the present invention.
Figure 4:
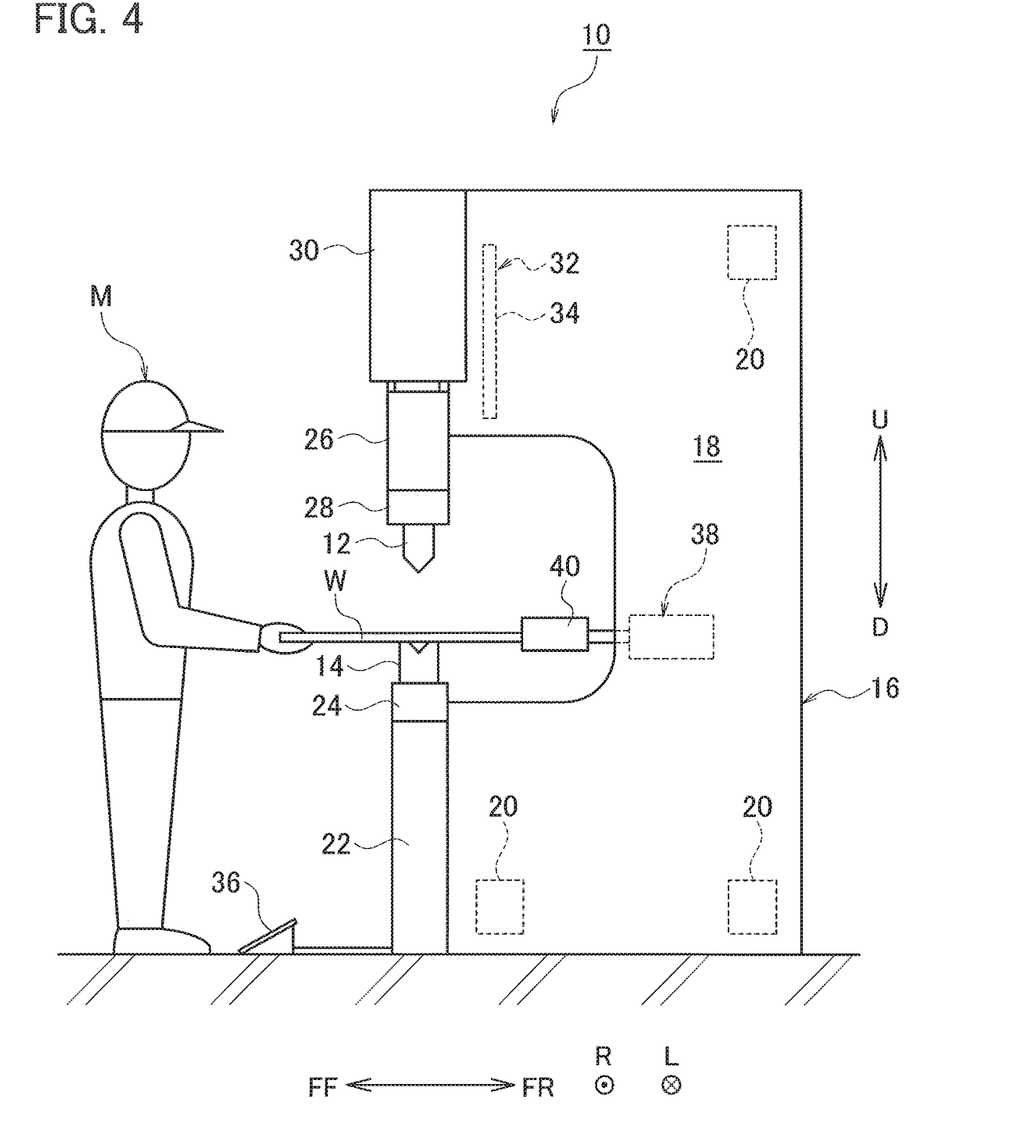
FIG. 4 is a schematic right side view of a press brake according to an embodiment of the present invention in a state of omitting an optical safety device.

As shown in FIGS. 3 and 4, a press brake 10 according to an embodiment of the present invention is a working machine which performs bending work on a plate-like workpiece (sheet metal) W as a part to be worked by the cooperation (engagement) of an upper die 12 and a lower die 14. The press brake 10 includes a body frame 16. And, the body frame 16 includes a pair of side plates 18 spaced apart and opposed to each other in the longitudinal direction (lateral direction), and a plurality of connecting members 20 for connecting the pair of side plates 18.

A lower table 22 extending in the length direction is provided at a lower part of the body frame 16, and a lower mold 14 is detachably held on an upper side of the lower table 22 through a lower mold holder 24. An upper table 26 extending in the longitudinal direction is provided on an upper portion of the body frame 16 so as to be movable up and down (move up and down), and the upper table 26 vertically opposes the lower table 22. The upper table 26 detachably holds the upper mold 12 through the upper mold holder 28 on its lower side. Further, above each of the side plates 18, a hydraulic lifting cylinder 30 is provided as a lifting actuator for lifting and lowering the upper table 26.

Instead of the upper table 26 configured to be movable up and down, the lower table 22 may be configured to be movable up and down. Instead of using a hydraulic lift cylinder 30 as the lift actuator, a lift servomotor (not shown) may be used.

The press brake 10 includes a linear encoder 32 for detecting the height position of the upper table 26, that is, the height position of the tip (bottom) of the upper mold 12. The linear encoder 32 has a linear scale 34 provided on one side plate 18 and extending in the vertical direction, and a read head (not shown) provided at an appropriate position on the upper table 26 for reading the scale of a linear scale 34.

On a front side (Forward) of the lower table 22, a foot switch 36 as an activation switch for outputting a predetermined activation signal by a stepping operation of an operator M is installed. The predetermined start signal is a signal for starting the lowering operation of the upper table 26 by driving the pair of elevating cylinders 30. A back gauge 38 for positioning the workpiece W in the depth direction (anteroposterior direction) with respect to the lower mold 14 is provided on the back side (rearward) of the lower table 22. The back gauge 38 has a butting member 40 capable of butting a end face of the work W, and the butting member 40 is position-adjustable in the depth direction.

The press brake 10 is provided with an optical safety device 42 for monitoring intrusion of foreign bodies other than the work W between the upper mold 12 and the lower mold 14. The specific configuration of the optical safety device (Optical safety device for press brake) 42 is as follows.

As shown in FIGS. 3 and 4, on one side (right) in the length direction of the upper table 26, a projector 44 which projects six laser beams B as monitoring light toward the other side (left) in the length direction of the upper table 26, passing directly under the upper mold 12 and in the vicinity of its front side, is provided via a first support mechanism 46. The projector 44 has one laser diode 48 as a light emitting element for emitting a laser beam B, and a mask 50 provided on the emission side of the laser diode 48 and having six openings (Not shown) formed therein. The first support mechanism 46 has, for example, a known structure as disclosed in the aforementioned Patent Literature 2: Japanese Patent Application Publication No. 2016-128180, and the relative height position of the light projector 44 with respect to the upper table 26 can be adjusted by the height of the upper mold 12.

Figure 5:
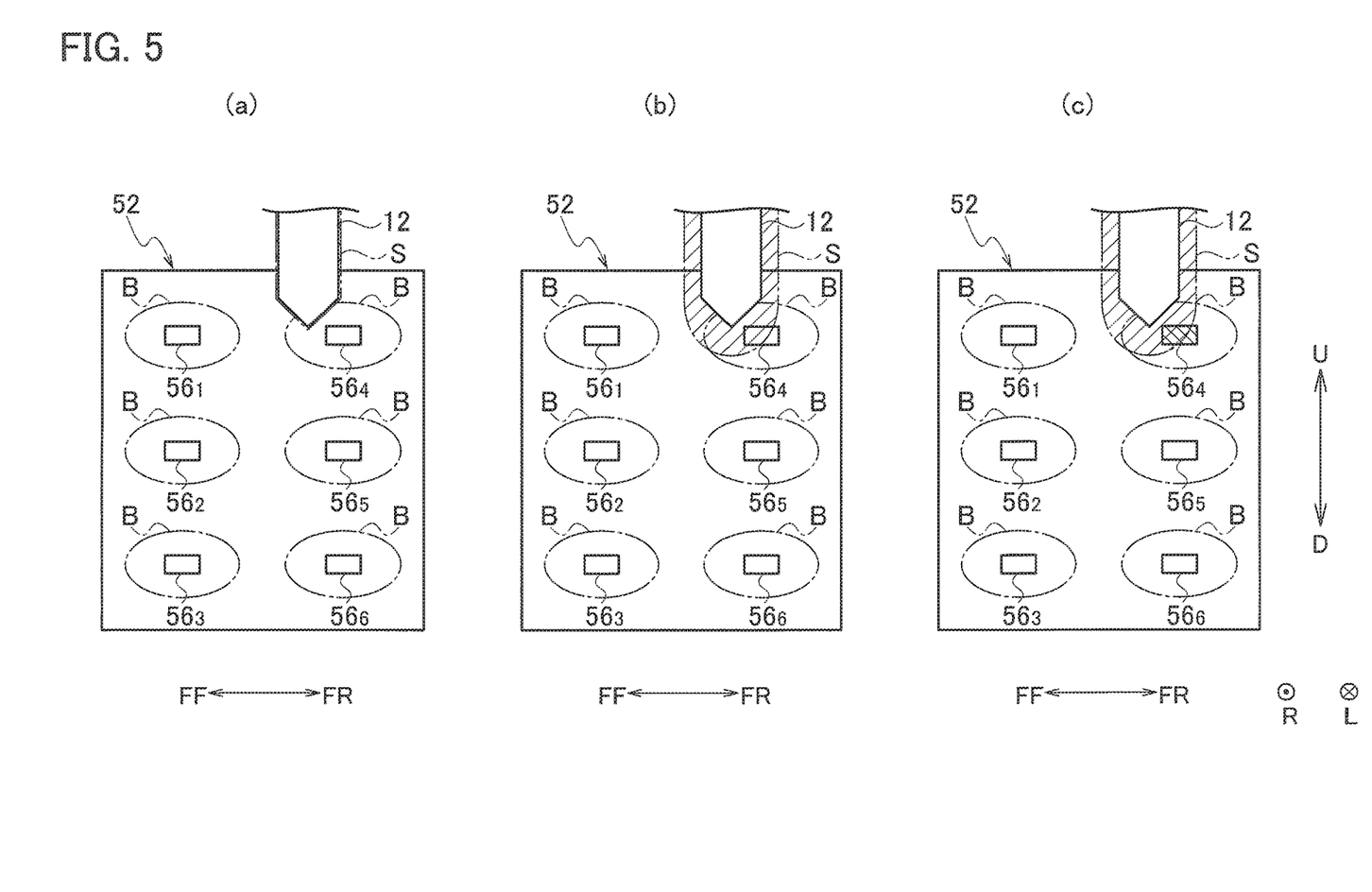

As shown in FIGS. 3, 4, and 5 (a), a photodetector 52 for receiving six laser beams B is provided on the other lengthwise side (Left) of the upper table 26 via a second support mechanism 54. The light receiver 52 has six photodiodes 56 (561~566) serving as six light receiving elements for outputting electric signals (voltage signal) corresponding to the amount of received light of the laser beam B, and each photodiode 56 (561~566) faces a corresponding opening of the mask 50. The three photodiodes 561~563 positioned on the front side (FF side) receive three laser beams B projected in the vicinity of the front side immediately below the upper mold 12 toward the other side in the longitudinal direction of the upper table 26. The three photodiodes 564~566 located on the rear side (FR side) receive the three laser beams B projected in the longitudinal direction of the upper table 26 directly under the upper mold 12. The photodiode 564 is located nearest to the upper mold 12. The second support mechanism 54 has, for example, a known structure as described in the aforementioned Patent Literature 2, and the relative height position of the light receiver 52 with respect to the upper table 26 can be adjusted by the height of the upper mold 12.

The number of laser beams B generated by one laser diode 48 and the mask 50 may be appropriately changed. Instead of six laser beams B being generated by one laser diode 48 and a mask 50, six laser beams B may be generated by six (same number of laser beams B) laser diodes 48. The mask 50 may be omitted, and one laser beam B may be received by six photodiodes 56. The monitoring light may be a parallel light, and an LED light may be used instead of the laser light B. In this case, a light emitting diode (Not shown) is used as the light emitting element instead of the laser diode 48.

Figure 6:
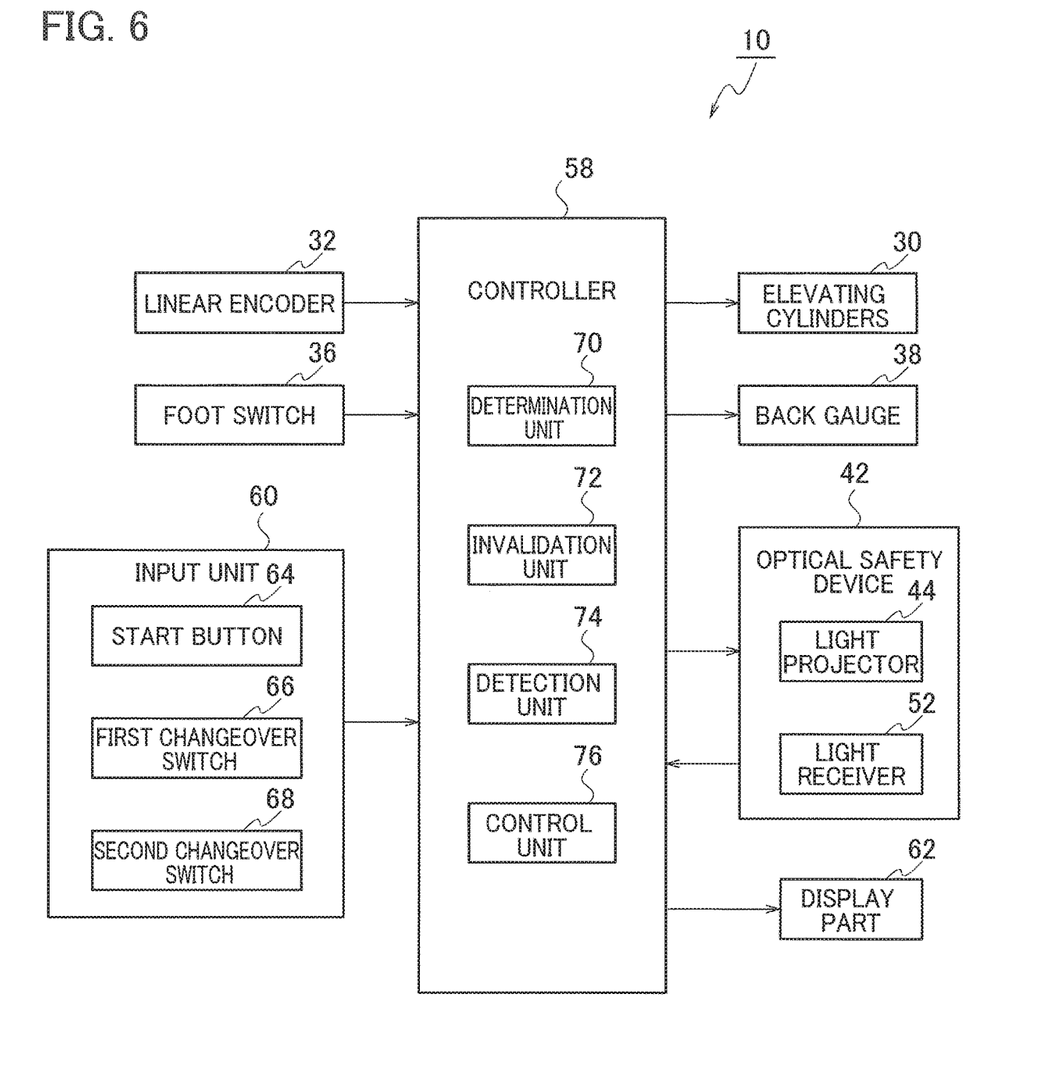
FIG. 6 is a control block diagram of a press brake according to an embodiment of the present invention.

As shown in FIG. 6, the press brake 10 includes a controller 58 for controlling a pair of elevating cylinders 30, aback gauge 38, an optical safety device 42 and the like based on a machining program, a monitoring program and the like. The controller 58 is constituted by one or a plurality of computers, and a linear encoder 32, a foot switch 36, and the like are connected to the controller 58.

The controller 58 has a memory (not shown) for storing a processing program, a monitoring program, and the like, and a CPU (not shown) for interpreting and executing the processing program, the monitoring program, and the like. The control device 58 is provided with an input part 60 for inputting die information, work information, product information, etc., and a display part 62 for always displaying the die information, work information, product information, etc. The die information includes information representing the shape and dimensions of the upper die 12, the distance from the light receiver 52 to the end face of the upper die 12, and the shape and dimensions of the lower die 14. The work information includes information representing the material, shape, dimensions, etc. of the work W, and the product information includes information representing the shape, dimensions, etc. of the product (not shown).

As shown in FIGS. 5(a) and 6, the input unit 60 has a start button 64 for starting the programmed operation of the press brake 10. The input unit 60 has a first changeover switch 66 for switching the three photodiodes 561~563 positioned on the front side to the invalidated state, and a second changeover switch 68 for switching the photodiodes 564 positioned closest to the upper mold 12 to the invalidated state.

The controller 58 has a function as the determination unit 70, a function as an invalidation unit 72, a function as detection unit 74, and a function as a control unit 76. Specific contents of the determination unit 70, the invalidation unit 72, the detection unit 74, and the control unit 76 are as follows.

As shown in FIGS. 5 (a), 5 (b), and 6, before starting the lowering operation of the upper table 26 (previous), the determination unit 70 determines whether or not the shadow of the upper mold 12 by the laser beam B projected on the side of the light receiver 52 is enlarged to the photodiode 564, based on the light receiving state (result of light reception) of the photodiode 12 located in the nearest vicinity of the upper mold 564. Specifically, before starting the descending operation of the upper table 26, the determination unit 70 determines whether or not the amount of light received by the photodiode 564 (amount of light received per unit time) is equal to or less than a predetermined first threshold value. If the amount of light received by the photodiode 564 is equal to or less than the predetermined first threshold value, the determination unit 70 determines that the shadow of the upper mold 12 is expanded to the photodiode 564. If the amount of light received by the photodiode 564 exceeds the predetermined first threshold value, the determination unit 70 determines that the shadow of the upper mold 12 has not expanded to the photodiode 564. The predetermined first threshold value is a value set in advance for determining whether or not the shadow of the upper mold 12 extends to the photodiode 564.

Figure 8:
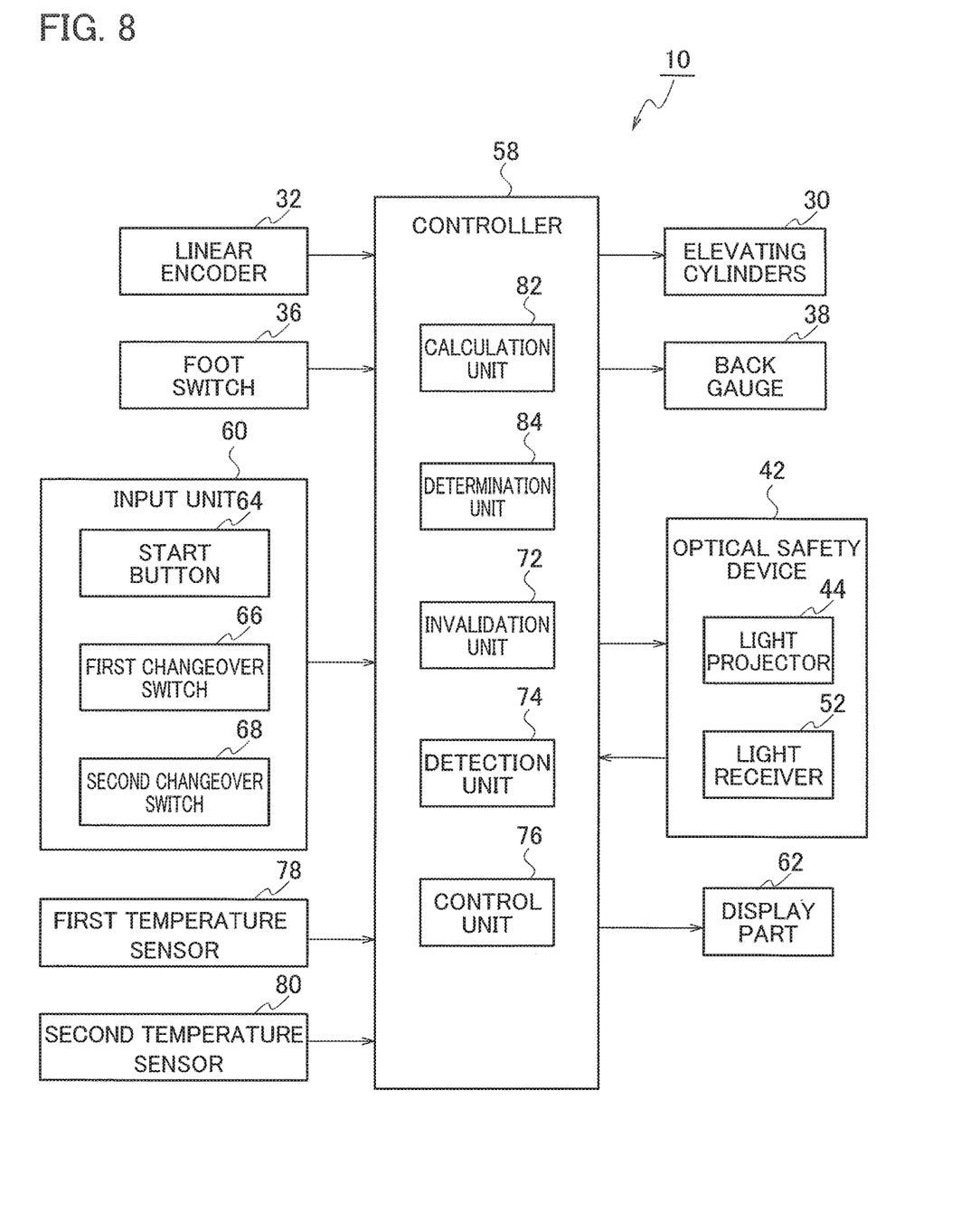
FIG. 8 is a control block diagram of a press brake in a modification of the embodiment of the present invention.

As shown in FIGS. 5 (b) (c) and 8, the invalidating section 72 invalidates the photodiode 564 when it is determined that the shadow of the upper mold 12 is enlarged to the photodiode 564 located nearest to the upper mold 12. The invalidating unit 72 invalidates the three photodiodes 561~563 positioned on the front side when the first changeover switch 66 is operated by the worker M to perform box bending of the work W. The invalidating unit 72 invalidates the photodiode 564 located in the closest vicinity of the upper mold 12 when the second changeover switch 68 is changed operation by the worker M. Note that, in FIG. 5(*c*), the hatching attached to the photodiode 564 located in the closest vicinity of the upper mold 12 indicates that the photodiode 564 is in the invalidated state.

As shown in FIGS. 3, 5 (*a*), and 6, during the lowering operation of the upper table 26, the detector 74 detects the presence or absence of foreign body between the upper mold 12 and the lower mold 14 based on the light receiving states (result of light reception) of the effective plurality of photodiodes 56. Specifically, the detector 74 detects whether or not the amount of light received by any effective photodiode 56 (amount of light received per unit time) is equal to or less than a predetermined second threshold value during the lowering operation of the upper table 26. When the amount of light received by any effective photodiode 56 is equal to or less than a predetermined second threshold value, the detection unit 74 detects the presence of foreign body between the upper mold 12 and the lower mold 14. When the amount of light received by all the effective photodiodes 56 exceeds a predetermined second threshold, a detection part 74 detects no foreign body between the upper mold 12 and the lower mold 14. The predetermined second threshold value is a value set in advance for detecting the presence or absence of a foreign substance between the upper mold 12 and the lower mold 14, and may be the same value as the first threshold value.

The control unit 76 controls the pair of elevating cylinders 30 (hydraulic unit of the elevating cylinder 30) so as to start the lowering operation of the upper table 26 when a predetermined start signal is output from the foot switch 36. The control unit 76 controls the pair of elevating cylinders 30 so as to reduce the lowering speed of the upper table 26 when the height position of the tip of the upper mold 12 is positioned at a predetermined height position close to the work W while monitoring the detection result from the linear encoder 32. The predetermined height position is either a first height position or a second height position higher than the first height position. In normal bending processing, the first height position is selected as the predetermined height position. When the three photodiodes 561~563 positioned on the front side and the photodiode 564 located in the closest vicinity of the upper mold 12 is in the invalidated state, the second height position is selected as the predetermined height position.

When it is detected that there is a foreign substance between the upper mold 12 and the lower mold 14, the control unit 76 controls the pair of elevating cylinders 30 (hydraulic unit of the elevating cylinder 30) so as to stop the lowering operation of the upper table 26. When the height position of the tip of the upper mold 12 is at a predetermined height position, the control unit 76 need not control the pair of elevating cylinders 30 so as to stop the lowering operation of the upper table 26.

Here, the first changeover switch 66, the second changeover switch 68, the determination unit 70, the invalidation unit 72, and the detection unit 74 are regarded as a part of the optical safety device 42.

Next, the operation of the embodiment of the present invention including the optical monitoring method according to the embodiment of the present invention will be described with reference to FIG. 7 and the like. An optical monitoring method according to an embodiment of the present invention is a method of monitoring the presence or absence of foreign body between an upper mold 12 and a lower mold 14 using a light projector 44 and a light receiver 52, based on the light receiving state of a plurality of photodiodes 56 in the light receiver 52. An optical monitoring method according to an embodiment of the present invention includes a determination step, an invalidation step, a detection step, and a stop step.

Figure 7:
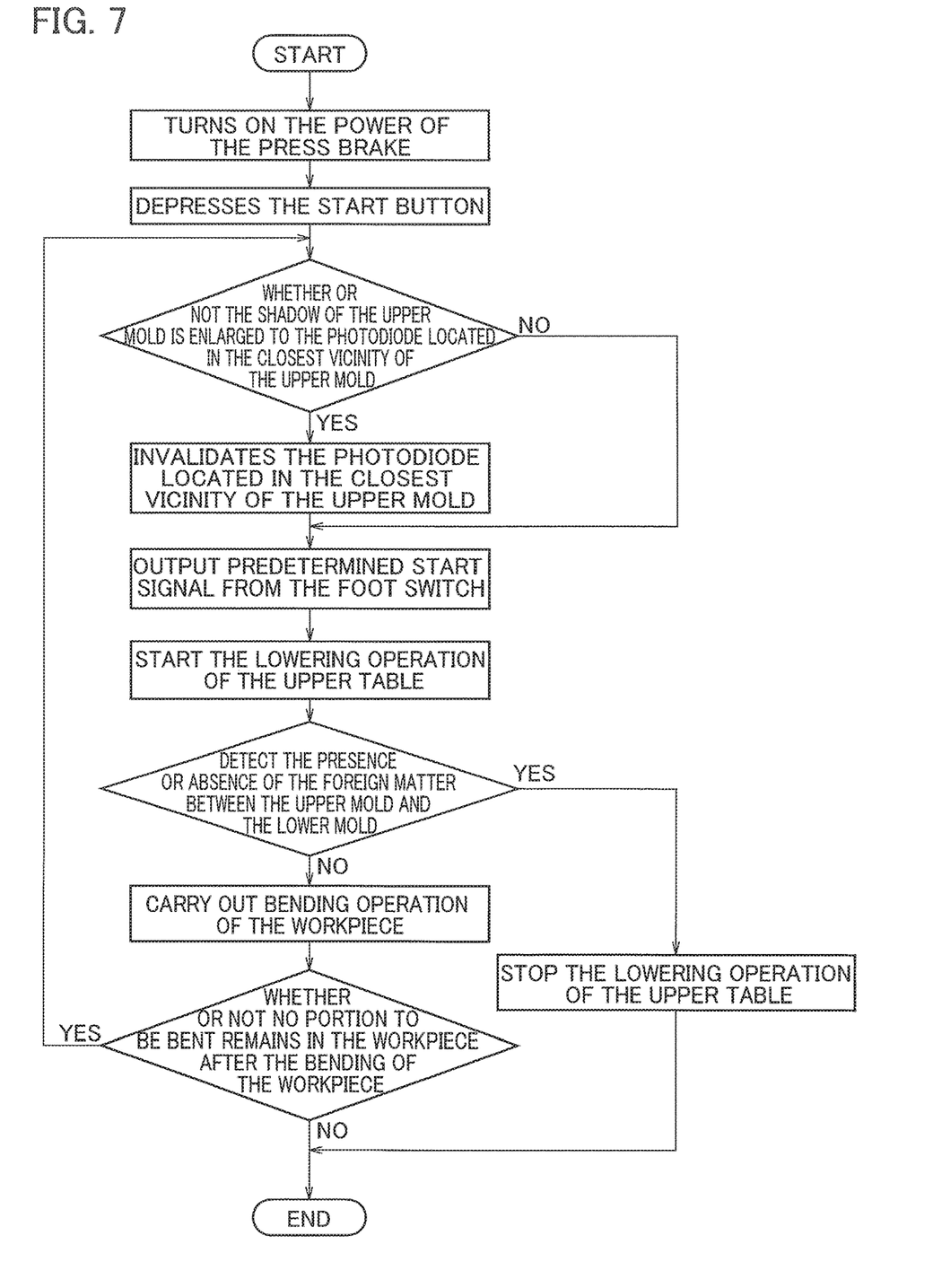
FIG. 7 is a flowchart showing the operation of a press brake according to an embodiment of the present invention.

The operator M turns on the power of the press brake 10 (Step 101 in FIG. 7) and depresses the start button 64 (Step 102 in FIG. 7). Then, six laser beams B are projected from the projector 44 toward a position directly below the upper mold 12 and the vicinity of its front side. Then, the determination unit 70 determines whether or not the shadow of the upper mold 12 by the laser beam B projected on the side of the light receiver 52 is enlarged to the photodiode 564 based on the light receiving state of the photodiode 12 located in the closest vicinity of the upper mold 564 (Step 103 in FIG. 7, a determination step).

When it is determined that the shadow of the upper mold 12 extends to the photodiode 564 (Yes in step 103 in FIG. 7), the invalidating section 72 invalidates the photodiode 564 (Step 104 in FIG. 7, the invalidating step). When box bending is performed on the work W and the first changeover switch 66 is operated by the worker M, the invalidating section 72 invalidates the three photodiodes 561~563 positioned on the front side.

After that, when the operator M performs a foot operation of the foot switch 36, a predetermined start signal is outputted from the foot switch 36 (Step 105 of FIG. 7). Then, the control unit 76 controls the pair of elevating cylinders 30 to start the lowering operation of the upper table 26 (Step 106 in FIG. 7). Then, the detection unit 74 detects the presence or absence of the foreign body between the upper mold 12 and the lower mold 14 based on the light-receiving states (result of light reception) of the plurality of photodiodes 56 (Step 107 and detection step in FIG. 7).

When it is detected that there is no foreign body between the upper mold 12 and the lower mold 14 (No in step 107 in FIG. 7), the lowering operation of the upper table 26 is continued. When the height position of the tip of the upper mold 12 is positioned at a predetermined height position close to the workpiece W, the control unit 76 controls the pair of elevating cylinders 30 to reduce the lowering speed of the upper table 26. Thus, the work W can be bent by the cooperation (engagement) of the upper mold 12 and the lower mold 14 (Step 108 of FIG. 7). On the other hand, when the presence of foreign body between the upper mold 12 and the lower mold 14 is detected (Yes in step 107 in FIG. 7), the control unit 76 controls the pair of elevating cylinders 30 to stop the lowering operation of the upper table 26 (Step 109 and the stop step in FIG. 7).

When the CPU of the control device 58 determines that no portion to be bent remains in the workpiece W after the bending of the workpiece W (No in step 110 in FIG. 7), the CPU finishes the series of processes. On the other hand, when the CPU of the control device 58 determines that a portion to be bent on the workpiece W remains after the bending of the workpiece W (Yes in step 110 in FIG. 7), the CPU returns the process to the step 103 in FIG. 7.

It should be noted that the process of step 103 in FIG. 7 (decision step) may be omitted. In this case, in the invalidating process of step 104 in FIG. 7, the invalidating unit 72 invalidates the photodiode 564 located nearest to the upper mold 12 when the second changeover switch 68 is operated by the operator M.

As described above, the invalidating unit 72 invalidates the photodiode 564 when the shadow S of the upper mold 12 extends to the photodiode 564 located in the closest vicinity of the upper mold 12. Thus, it is prevented that although there is no foreign body between the upper mold 12 and the lower mold 14, the presence of foreign body between the upper mold 12 and the lower mold 14 is erroneously detected by the detecting part 74 by the shadow S of the upper mold 12.

Therefore, according to the embodiment of the present invention, it is possible to sufficiently prevent the lowering operation of the upper table from being stopped by the shadow S of the upper die 12 even when the bending is performed with the long upper die 12 attached to the press brake 10 having the long overall length. Therefore, according to the embodiment of the present invention, the press brake 10 is equipped with the optical safety device 42, and the working efficiency (productivity) of the press brake 10 is improved while sufficiently securing the safety of the bending work.

Modifications of the Embodiment of the Present Invention

A modification of the embodiment of the present invention will be described only with respect to a portion different from the above-described embodiment of the present invention.

As shown in FIGS. 8 and 3, a first temperature sensor 78 for measuring the temperature of the member at the tip of the upper mold 12 and a second temperature sensor 80 for measuring the environmental temperature in the factory are connected to the control device 58. The control device 58 has a function as the calculation unit 82 and a function as the determination unit 84 in place of the function as the determination unit 70. The specific contents of the calculation unit 82 and the determination unit 84 are as follows.

As shown in FIGS. 5 (*a*) and 5 (*b*) and FIG. 8, the calculation unit 82 calculates the enlargement amount of the shadow S of the upper mold 12 based on the member temperature of the tip of the upper mold 12, which is a measurement result from the first temperature sensor 78, the environmental temperature in the factory, which is a measurement result from the second temperature sensor 80, the length of the upper mold 12, and the distance from the light receiver 52 to the end surface of the upper mold 12. The enlargement amount of the shadow S of the upper mold 12 refers to the maximum amount by which the shadow S of the upper mold 12 protrudes from the outline of the upper mold 12. It is preferable that the calculation unit 82 calculates the enlargement amount of the shadow S of the upper mold 12 in consideration of the distance from the light receiver 52 to the end face of the upper mold 12. The calculation unit 82 may calculate the enlargement amount of the shadow S of the upper mold 12 based on the captured image captured from the side of the projector 44 by the camera (not shown).

Just before starting the lowering operation of the upper table 26 (Previous), a determination part 84 determines whether or not the shadow S of the upper mold 12 is enlarged up to a photodiode 564 positioned nearest to the upper mold 12 based on the calculated enlargement amount of the shadow S of the upper mold 12. Specifically, before starting the lowering operation of the upper table 26, the determination unit 84 determines whether the enlargement amount of the shadow S of the upper mold 12 is equal to or larger than a predetermined enlargement amount. If the enlargement amount of the shadow S of the upper mold 12 is equal to or larger than a predetermined enlargement amount, the determination unit 84 determines that the shadow of the upper mold 12 is enlarged up to the photodiode 564. When the enlargement amount of the shadow S of the upper mold 12 is less than a predetermined enlargement amount, the determination part 84 determines that the shadow of the upper mold 12 is not enlarged to the photodiode 564. The predetermined enlargement amount is a preset enlargement amount for determining whether or not the shadow of the upper mold 12 is enlarged to the photodiode 564.

In the modification of the embodiment of the present invention, immediately before the processing of step 103 in FIG. 7, the calculation unit 82 calculates the enlargement amount of the shadow S of the upper mold 12 (calculation step). In other words, the optical monitoring method according to a modification of the embodiment of the present invention includes a calculation step immediately before the processing of step 103. In the process of step S 103 in FIG. 7, the determination unit 84 determines, based on the calculated enlargement amount of the shadow S of the upper mold 12, whether or not the shadow S of the upper mold 12 has been enlarged up to the photodiode 564 located in the vicinity of the upper mold 12 (decision step).

The modification of the embodiment of the present invention also produces the same effect as the embodiment of the present invention described above.

It should be noted that the present invention is not limited to the description of the above-described embodiments, and may be implemented in various forms, for example, as follows.

The determination unit 70 may determine whether or not the shadow of the mold 12 is enlarged to any of the four photodiodes 561,562,565 based on not only the light receiving state of the photodiode 564 located in the closest vicinity of the upper mold 12 but also the light receiving states of the three photodiodes 561,562,564,565. Similarly, the determination unit 84 may determine, based on the calculated enlargement amount of the shadow S of the upper mold 12, whether or not the shadow S of the upper mold 12 has been enlarged to any one of the photodiodes 561,562,565 in addition to the photodiode 564 located in the vicinity of the upper mold 12.

The scope of rights included in the present invention is not limited to the above-described embodiments.

INDUSTRIAL APPLICABILITY

According to the present invention, even when bending is performed in a state where a long upper die is attached to the press brake having a long overall length, the relative lowering operation of the upper table can be sufficiently prevented from being stopped by the shadow of the upper die. Therefore, according to the present invention, the press brake can be equipped with an optical safety device, and the working efficiency (productivity) of the press brake can be enhanced while sufficiently securing the safety of the bending work.

The invention claimed is:

1. An optical safety device for a press brake comprising:
   a projector provided on one side in a length direction of an upper table in the press brake for projecting a monitoring light directly under an upper tool and toward the other side in the length direction of the upper table;
   a photodetector provided on the other side in the length direction of the upper table and having a plurality of light receiving elements for outputting electric signals corresponding to an amount of the monitoring light, and for receiving the monitoring light;

a first sensor that acquires a member temperature of the upper tool, and a second sensor that acquires an environmental temperature in which the press brake is installed:

a calculation unit for calculating an amount of enlargement of the shadow of the upper tool generated by refracting the monitoring light projected by the projector, based on at least the member temperature of the upper tool acquired by the first sensor and the environmental temperature in which the press brake is installed acquired by the second sensor;

a determination unit for determining whether or not a shadow of the upper tool extends to a light receiving element of the plurality of light receiving elements located closest to the upper tool based on the calculated amount of enlargement of the shadow of the upper tool before the press brake starts a lowering operation of the upper table relative to the lower table in the press brake;

an invalidation unit configured to invalidate the light receiving element located closest to the upper tool when it is determined that the shadow of the upper tool extends to the light receiving element located closest to the upper tool; and a detector for detecting a presence or absence of a foreign body between the upper tool and the lower tool based on a respective light receiving state of each light receiving element of the plurality of light receiving elements other than the invalidated light receiving element located closest to the upper tool by detecting whether or not the amount of monitoring light received by any one of the light receiving elements of the plurality of light receiving elements other than the invalidated light receiving element located closest to the upper tool is equal to or less than a respective predetermined threshold value when it is determined that the shadow of the upper tool extends to the light receiving element located closest to the upper tool during the lowering operation of the upper table relative to the lower table.

2. The optical safety device according to claim 1, wherein the optical safety device is provided with a changeover switch for switching the light receiving element located closest to the upper tool to an invalidated state, and the invalidating unit invalidates the light receiving element located closest to the upper tool when the changeover switch is operated.

3. A press brake including the optical safety device according to claim 1.

4. An optical monitoring method, by using a light projector provided on one side in a length direction of an upper table in a press brake for projecting monitoring light directly under an upper tool toward other side in the length direction of the upper table and a plurality of light receiving elements provided on the other side in the length direction of the upper table and receiving the monitoring light, for monitoring a presence or an absence of a foreign substance between the upper tool and a lower tool based on respective light receiving states of each of the plurality of light receiving elements in a photodetector, comprising;

a step of acquiring a member temperature of the upper tool by a first sensor, and an environmental temperature in which the press brake is installed by a second sensor, a step of calculating an amount of enlargement of the shadow of the upper tool generated by refracting the monitoring light projected by the projector, based on at least the member temperature of the upper tool acquired b the first sensor and the environmental temperature in which the press brake is installed acquired by the second sensor, a step of determining whether or not a shadow of the upper tool is expanded to a light receiving element of the plurality of light receiving elements located closest to the upper tool based on the calculated amount of enlargement of the shadow of the upper tool, before the press brake starts a lowering operation of the upper table relative to the lower table in the press brake, a step of invalidating the light receiving element located closest to the upper tool when it is determined that the shadow of the upper tool extends to the light receiving element located closest to the upper tool, and a step of detecting a presence or absence of a foreign body between the upper tool and the lower tool based on the respective light receiving state of each light receiving element of the plurality of light receiving elements other than the invalidated light receiving element located closest to the upper tool by detecting whether or not an amount of monitoring light received by any one of the light receiving elements of the plurality of light receiving elements other than the invalidated light receiving element located closest to the upper tool is equal to or less than a respective predetermined threshold value when it is determined that the shadow of the upper tool extends to the light receiving element located closest to the upper tool during the lowering operation of the upper table relative to a lower table.

5. An optical safety device for a press brake comprising:

a projector provided on one side in a length direction of an upper table in the press brake for projecting a monitoring light directly under an upper tool and toward the other side in the length direction of the upper table;

a photodetector provided on the other side in the length direction of the upper table and having a plurality of light receiving element for outputting electric signals corresponding to amount of the monitoring light and receiving the monitoring light;

a first sensor that acquires a member temperature of the upper tool, and a second sensor that acquires an environmental temperature in which the press brake is installed:

a calculation unit for calculating an amount of enlargement of the shadow of the upper tool generated by refracting the monitoring light projected by the projector, based on at least the member temperature of the upper tool acquired by the first sensor and the environmental temperature in which the press brake is installed acquired by the second sensor;

an invalidation unit configured to invalidate a light receiving element located closest to the upper tool when a shadow of the upper tool projected on the photodetector by the monitoring light extends to the light receiving element located closest to the upper tool based on the calculated amount of enlargement of the shadow of the upper tool before starting a lowering operation of the upper table relative to the lower table; and a detector for detecting a presence or absence of a foreign body between the upper tool and the lower tool based on a respective light receiving state of each light receiving element of the plurality of light receiving elements other than the invalidated light receiving element located closest to the upper tool by detecting whether or not the amount of monitoring light received by any one of the light receiving elements of the plurality of light receiving elements other than the invalidated light receiving element located closest to the upper tool is equal to or less than a respective predetermined threshold value when it is determined that the shadow of the upper tool extends to the light receiving element located closest to the upper tool during the lowering operation of the upper table relative to the lower table.

* * * * *